United States Patent
Olaru

(10) Patent No.: US 7,118,704 B2
(45) Date of Patent: Oct. 10, 2006

(54) NOZZLE AND METHOD FOR MAKING A NOZZLE WITH A REMOVABLE AND REPLACEABLE HEATING DEVICE

(75) Inventor: George Olaru, Toronto (CA)

(73) Assignee: Mold-Masters Limited, Georgetown (CA)

( * ) Notice: Subject to any disclaimer, the term of this patent is extended or adjusted under 35 U.S.C. 154(b) by 480 days.

(21) Appl. No.: 10/732,417

(22) Filed: Dec. 11, 2003

(65) Prior Publication Data
US 2004/0121039 A1   Jun. 24, 2004

Related U.S. Application Data

(60) Provisional application No. 60/432,986, filed on Dec. 13, 2002.

(51) Int. Cl.
*B29C 45/20* (2006.01)
(52) U.S. Cl. .................. 264/328.15; 29/611; 29/890.1; 425/549
(58) Field of Classification Search ................ 425/549; 264/328.15; 29/611, 890.1
See application file for complete search history.

(56) References Cited

U.S. PATENT DOCUMENTS

| | | |
|---|---|---|
| 3,812,323 A | 5/1974 | Pink |
| 3,935,972 A | 2/1976 | Tsunemoto et al. |
| 4,120,086 A | 10/1978 | Crandell |
| 4,268,241 A | 5/1981 | Rees et al. |
| 4,711,625 A | 12/1987 | Knauer et al. |
| 4,726,751 A | 2/1988 | Shibata et al. |
| 4,793,795 A | 12/1988 | Schmidt et al. |
| 4,882,469 A | 11/1989 | Trakas |
| 4,892,474 A | 1/1990 | Gellert |
| 4,923,387 A | 5/1990 | Gellert |
| 4,988,848 A | 1/1991 | Trakas |
| 5,113,576 A | 5/1992 | van Boekel et al. |
| 5,136,141 A | 8/1992 | Trakas |
| 5,326,251 A | 7/1994 | Gellert |
| 5,352,109 A | 10/1994 | Benenati |
| 5,360,333 A | 11/1994 | Schmidt |
| 5,411,392 A | 5/1995 | Von Buren |
| 5,922,367 A | 7/1999 | Assalita et al. |

(Continued)

FOREIGN PATENT DOCUMENTS

DE   7603206 U   6/1976

(Continued)

OTHER PUBLICATIONS

International search report EP 1 302 295 A3, published May 21, 2003.

(Continued)

*Primary Examiner*—Tim Heitbrink
(74) *Attorney, Agent, or Firm*—Sterne Kessler Goldstein & Fox PLLC

(57) ABSTRACT

A system and method including an injection molding system (e.g., nozzle) having a nozzle body with a heater holding portion that receives a heating device that is releasably secured in the heater holding portion. The nozzle has at least one flat or planar outer surface and can be made from a high wear and high pressure resistant material (e.g., Aermet). A slot of the heater holding portion and the heating device can be of complimentary geometries, such as rectangular shaped, wedge shaped, or any other shape. The heating device can include a holding device having receiving areas. Each receiving area can receive a respective heater that can be removed from the nozzle body. The nozzle body is provided with a clamping mechanism to insure an intimate contact between the heater holding portion and the heater device.

24 Claims, 4 Drawing Sheets

U.S. PATENT DOCUMENTS

| | | | |
|---|---|---|---|
| 6,043,466 | A | 3/2000 | Jenko et al. |
| 6,155,815 | A | 12/2000 | Crandell |
| 6,409,497 | B1 | 6/2002 | Wurstlin |
| 6,561,789 | B1 | 5/2003 | Gellert et al. |
| 6,619,948 | B1 | 9/2003 | Gunther |
| 6,712,597 | B1 | 3/2004 | Van Boekel |
| 6,780,003 | B1 | 8/2004 | Sicilia et al. |
| 6,805,549 | B1 | 10/2004 | Gunther |
| 2002/0102322 | A1 | 8/2002 | Gunther |
| 2002/0102332 | A1 | 8/2002 | Gunther |

FOREIGN PATENT DOCUMENTS

| | | |
|---|---|---|
| DE | 29 49 637 A1 | 6/1981 |
| DE | 3407894 | 9/1985 |
| DE | 86 20 956 U1 | 1/1987 |
| DE | 3525736 | 1/1987 |
| DE | 195 22 716 C1 | 9/1996 |
| DE | 197 23 374 A1 | 12/1997 |
| DE | 29918251 U | 12/1999 |
| EP | 0 402 501 A1 | 12/1990 |
| EP | 0 444 748 A1 | 9/1991 |
| JP | 1-58518 | 3/1989 |
| WO | WO 01/15884 A2 | 3/2001 |
| WO | WO01/15884 A2 | 3/2001 |

OTHER PUBLICATIONS

International search report EP 1 302 296 A3, published May 21, 2003.

International search report EP 1 428 646 A1, dated Mar. 26, 2004.

SECTION A-A

SECTION A-A

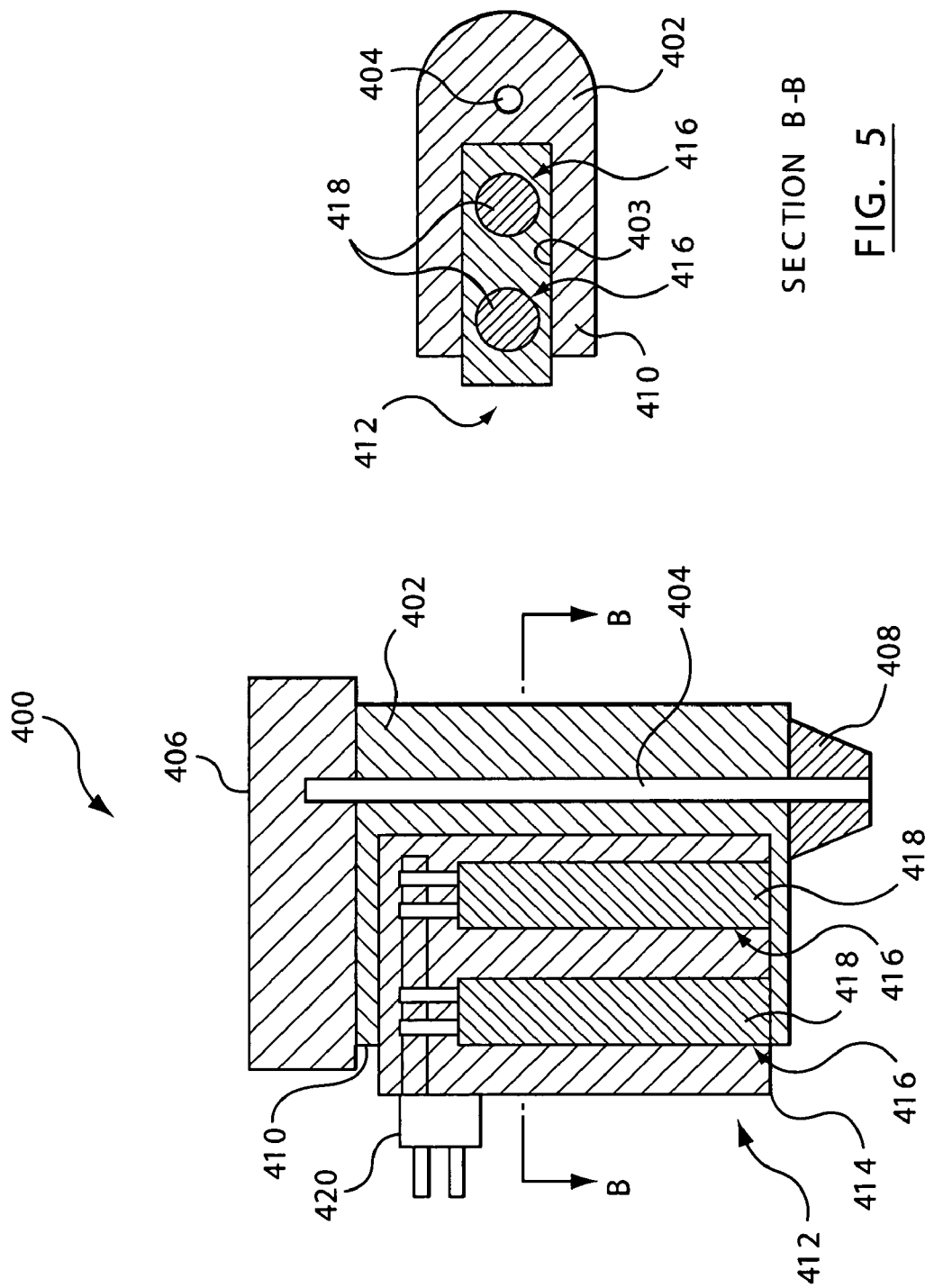

SECTION C-C

SECTION D-D

NOZZLE AND METHOD FOR MAKING A NOZZLE WITH A REMOVABLE AND REPLACEABLE HEATING DEVICE

CROSS-REFERENCE TO RELATED APPLICATIONS

This application claims benefit under 35 U.S.C. § 119(e) to U.S. Provisional Application No. 60/432,986, filed Dec. 13, 2002, entitled "Nozzle And Method For Making A Nozzle With A Removable And Replaceable Heating Device," which is incorporated by reference herein in its entirety.

BACKGROUND OF THE INVENTION

1. Field of the Invention

The present invention is related to making and using an injection-molding nozzle incorporating, a removable heating device and a heating device clamping mechanism associated therewith.

2. Background Art

Typically, injection-molding nozzles have a nozzle body including a melt channel with a heater element proximate thereto. Heaters in injection nozzles ideally produce a constant or consistent viscosity and speed of a melt stream of moldable material, which produces accurate items that are uniform in appearance. In conventional injection molding systems, when a heater starts to improperly function or fails completely, the entire nozzle might need to be removed from a manifold connection and replaced. Removing and replacing a nozzle requires shutting down a production line for an extended period of time. This increases manufacturing costs because of the expense of having to replace an entire nozzle, the inefficiency of production time, and the cost for labor being idle during removal and replacement of a nozzle.

A first type of heater element can be a "wrap around clamp" heater, such as a tubular heater, film heater, band heater, or a helical coil heater. The wrap around clamp heaters are wrapped around the nozzle body to uniformly heat the melt channel. If these wrap around heaters fail to perform while in operation, an operator must a) remove the heater by sliding it over the nozzle and towards the nozzle tip from the mold side, if there is access from the mold side, or b) remove the entire nozzle if there is no access from the front of the nozzle. Clamp heaters for hot runner nozzles are known, such as those disclosed in U.S. Pat. No. 5,411,392 to Von Buren, U.S. Pat. No. 6,409,497 to Wurstlin, U.S. Pat. No. 5,360,333 to Schmidt, U.S. Pat. No. 6,043,466 to Jenko et al, and U.S. Pat. No. 4,268,241 to Rees et al, which are all incorporated herein by reference in their entireties.

Most of the clamp heaters for hot runner application use a heater element attached to a cylindrical heater sleeve that incorporates a clamping mechanism. The clamping mechanism of the heater makes sure that an intimate contact is created between the heater sleeve and the nozzle body to provide maximum heat transfer and heat efficiency. In most cases either the heater element or the heater sleeve have a longitudinal or an axial cut or a disruption to allow the heater or the sleeve to be squeezed towards the nozzle body under the clamping force.

Another type of heater element is an embedded heater, such as a cast-in heater, cartridge heater, pressed in heater and heat pipe heater, which are located entirely inside (embedded in) the nozzle body proximate to and/or surrounding a melt channel. These embedded heaters tend to provide a desirable heat profile, a desirable heat transfer, and a desirable heat efficiency because they are located in intimate contact within the nozzle body. Embedded heaters tend to be disposed closer to the melt channel than the wrap around removable heaters. However, when the embedded heaters improperly function or fail, an entire nozzle must be replaced.

A third type of heater is related to the flat injection molding nozzles heater, such as cartridge heaters, where the heater is located inside the nozzle and/or coupled to the nozzle on one or two (possibly opposite) sides of the melt channel, usually inside the nozzle body. These heaters are typically used with flat small pitch nozzles and are in most instances located on a single side or opposite sides of the melt channel. These heaters can be clustered into arrays of two or more nozzles and are utilized in areas with very limited space.

For example, German patent application DE 19723374 assigned to Heitec teaches a flat nozzle for small pitch applications having one or two cylindrical cartridge heaters. The Heitec heaters are totally embedded inside the nozzle body, which prevents the heaters from receiving maintenance without removing the nozzles from the system. Another example is U.S. Pat. No. 6,619,948 to Gunther that shows a nozzle surrounded by a flat case. The flat case includes one or two embedded cylindrical heater elements. However, the Gunther heaters cannot be removed from the case while keeping the case fully installed on the nozzle. Thus, production must be completely shutdown so that a clearance space can be created between the nozzle and the mold for the removal of the case. Both of the above references are incorporated herein by reference in their entireties.

Some examples of other embedded heaters for injection molding nozzles can be found in U.S. Pat. Nos. 4,882,469, 4,899,435, 4,906,360, 4,988,848, 5,052,100, 5,055,028, 5,098,280, 5,136,141, 5,147,663, 5,180,594, all to Trakas, which are all incorporated herein by reference in their entireties.

Therefore, what is needed is a system and method to remove a faulty heater embedded in an injection nozzle, while allowing the nozzle to remain in contact with a manifold. What is also needed is a nozzle that allows for only a heater to be removed and replaced in a relatively short amount of time without requiring shutting down of operations and removal of the entire nozzle. What is also needed is an injection nozzle where a removable heater has an improved clamping function to increase heat transfer efficiency.

BRIEF SUMMARY OF THE INVENTION

One embodiment of the present invention provides an injection molding system configured to make molded parts. The injection molding system include a heating device, a manifold, and a nozzle in fluid communication with the manifold. The nozzle includes a nozzle body. The nozzle body includes a melt channel, at least one substantially flat outer surface, and an elongated heater holding portion running longitudinally along a side of the nozzle body, having a central axis parallel to a central axis of the melt channel, and configured to releasably secure the heater therein.

Another embodiment of the present invention provides a method for heating a melt in an injection molding system, including at least the following steps. Receiving the melt in a melt channel of a nozzle body. Operating a releasably secured heater that is secured in an elongated heating holding portion formed as a longitudinal slot in a side of the nozzle body.

A further embodiment of the present invention provides a method of making an injection molding apparatus including at least the following steps. Forming a manifold. Forming a nozzle in fluid communication with the manifold having a nozzle body including a melt channel and an elongated heater holding portion formed as a longitudinal slot in a side of the nozzle body. Releasably securing a heating device in the heater holding portion.

A still further embodiment of the present invention provides an injection molding nozzle including an injection nozzle body including a melt channel and heater holding portion. The heater holding portion having an opening adjacent an outlet of the melt channel. The nozzle also includes a heating device releasably secured in the heater holding portion, the heating device having a surface that bridges the opening.

A still further embodiment of the present invention provides an injection molding nozzle including an injection nozzle body including a melt channel and a heater holding portion having an opening adjacent an outlet of the melt channel on one end and a flat surface on an opposite end and a heating device releasably secured in the heater holding portion, said heating device having a flat surface contacting the flat surface of the heater holding portion.

A still further embodiment of the present invention provides an injection molding nozzle including an injection nozzle body including a melt channel having a first axis and a heater holding portion having a central axis parallel to the first axis and a heating device releasably secured in the heater holding portion, the heating device being removable from the heater holding portion in a direction along a second axis.

A still further embodiment of the present invention provides an injection molding nozzle including an injection nozzle body including a melt channel having a first axis and a heater holding portion having a central axis parallel to the first axis and a heating device releasably secured in the heater holding portion, the nozzle body configured to function as a clamping device to releasably secure the heating device at least partially in the nozzle body.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 4 shows a side-sectional view of a nozzle including a removable heating device according to an embodiment of the present invention.

FIG. 5 shows a cross-sectional view of a nozzle along line B—B in FIG. 4 according to an embodiment of the present invention.

Figure 1:
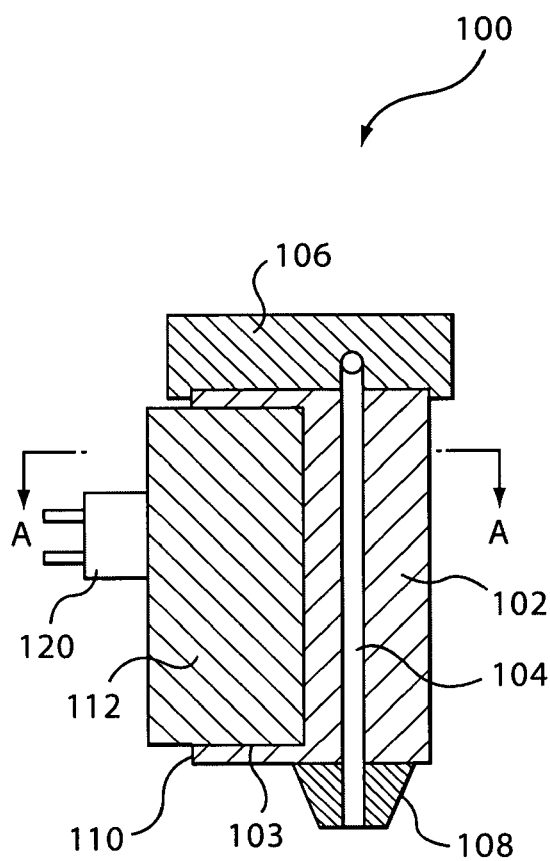
FIG. 1 shows a side-sectional view of a nozzle including a removable heating device according to an embodiment of the present invention.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

Removable/Replaceable Unitary Heating Device

FIG. 1 shows a side-sectional view of a system 100 (e.g., nozzle) according to an embodiment of the present invention, System 100 includes a nozzle body 102 having a melt channel 104. Melt channel 104 runs from manifold 106 through nozzle tip 108. Nozzle body 102 also includes a heater holding portion 110 (e.g., an elongated heater holding portion) that receives a releasably secured heating device 112 (e.g., a removable and/or replaceable heater). For example, heater holding portion 110 includes an elongated or longitudinal slot 103 in a side of nozzle body 102. Heater 112 can be powered through a coupler 120 that can couple heater 112 to any type of power source. It is also to be appreciated that all or part of nozzle body 102 can be made from a high wear and high pressure resistant material (e.g., Aermet® alloy, an iron-cobalt-nickel alloy that has been strengthened by carbon, chrome and molybdenum or any other materials known in the art).

Figure 2:
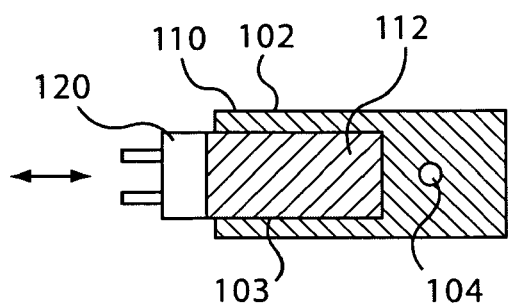
FIG. 2 shows a cross-sectional view of a nozzle along line A—A in FIG. 1 according to an embodiment of the present invention.
Figure 3:
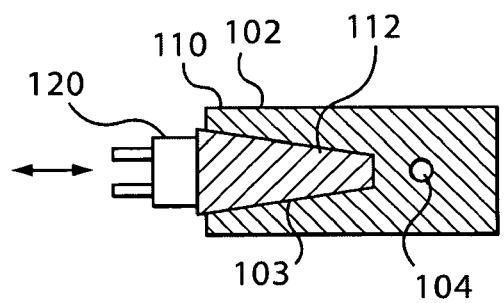
FIG. 3 shows a cross-sectional view of a nozzle along line A—A in FIG. 1 according to another embodiment of the present invention.

FIGS. 2 and 3 are cross-sectional views of nozzle body 102 along line A—A in FIG. 1. In FIG. 2 removable heater 112 and slot 103 of heater holding portion 110 have rectangular shapes. In FIG. 3 removable heater 112 and slot 103 of heater holding portion 110 have wedge-like shapes. It is to be appreciated that a slot or an opening of heater holding portion 110 and removable heater 112 can be of complimentary geometries or configurations, where all shapes and geometries are within the scope of the present invention.

Using this arrangement, if heater 112 were to malfunction or cease to function entirely, only removable heater 112 would need to be removed and replaced and not the entire nozzle body 102. Having to remove and replace only heater 112 and not nozzle body 102 can substantially reduce downtime during maintenance. Thus, having removable heater 112 increases production efficiency by substantially reducing production or manufacturing downtime. Also, having removable heater 112 substantially decreases maintenance costs by only having to replace heater 112 and not the entire nozzle body 102.

It is to be appreciated that nozzle body 102 can be a small pitch nozzle, flat nozzle, or any other nozzle system using thermal gating, valve gating, or the like.

Conventionally, when flat nozzles are used, arrays of the flat nozzles can be positioned close together. Thus, when an internally positioned flat nozzle's heater malfunctions, a lot of time is spent disassembling an entire array of flat nozzles and replacing the flat nozzle having the malfunctioning heater. In contrast to this burdensome and time consuming process, according to embodiments of the present invention, removable and/or replaceable heater 112 in flat nozzle 102 allows for quick and easy removal and replacement without disassembling an entire array of flat nozzles.

Removable/Replaceable Heating Device

FIG. 4 shows a side-sectional view of a system 400 (e.g., a nozzle) according to an embodiment of the present invention. FIG. 5 shows a cross-sectional view of nozzle 400 along line B—B in FIG. 4. Nozzle 400 includes a nozzle body 402 having a melt channel 404. Melt channel 404 runs from a manifold 406 through a nozzle tip 408. Nozzle body 402 also includes a heater holding portion 410 (e.g., an elongated heater holding portion) that receives a releasably secured heating device 412 (e.g., a removable heater). Heating device 412 can be powered though coupler 420 that can couple heater 412 to any type of power source (not shown).

In the embodiment of FIG. 4, heating device 412 includes a holding device 414 (e.g., a removable heater casing) having one or more receiving areas 416 that each receive a respective one of heaters 418. It is to be appreciated that although only two receiving areas 416 and two heaters 418 are shown, more or less of each can be used as would be apparent to one of ordinary skill in the art upon reading this description. Also, it is to be appreciated that although heating device 412 and a slot 403 of heater holding portion 410 are shown to be rectangular in shape, any shape can be used, all of which are contemplated within the scope of the present invention. Similarly, receiving area(s) 416 and heater(s) 418 can be of any shape, all of which are contemplated within the scope of the present invention. The benefits of using a removable heating device are the same as those described above.

Removing of A Removable/Replaceable Unitary Heating Device

FIGS. 6A–B and 7A–C show various embodiments of the present invention illustrating a configuration of systems (e.g., nozzles) allowing for releasing or removal of a partially and/or totally embedded heater in different directions (along different axis) relative to an axis of symmetry of a melt channel in the nozzle.

Figure 6B:
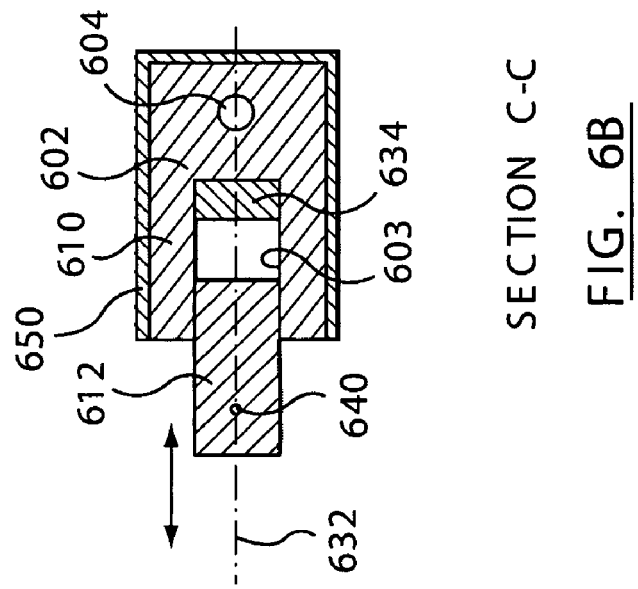
FIG. 6B shows a cross-sectional view of a nozzle along line C—C in FIG. 6A according to an embodiment of the present invention.
Figure 6A:
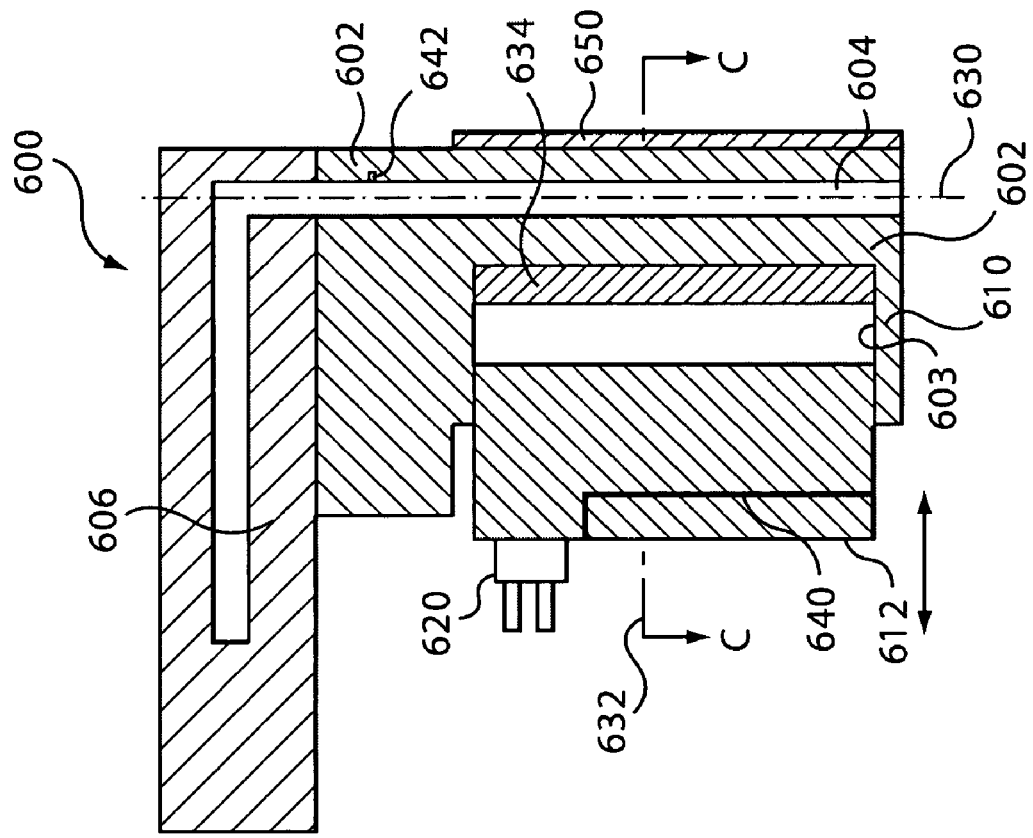
FIG. 6A shows a side-sectional view of a nozzle including a removable heating device according to an embodiment of the present invention.

FIG. 6A shows a side-sectional view of a nozzle 600 according to an embodiment of the present invention. FIG. 6B shows a cross-sectional view of nozzle 600 along line C—C in FIG. 6A. Nozzle 600 includes a nozzle body 602 having a melt channel 604. Melt channel 604 runs from manifold 606 through a nozzle tip (not shown). Melt channel 604 has an axis of symmetry 630.

Nozzle body 602 also includes a heater holding portion 610 (e.g., an elongated heater holding portion) with a slot 603 that receives a releasably secured heating device 612 (e.g., a removable heater). An axis 632 runs through the heater holding portion 610, which is perpendicular to axis 630. In this embodiment, heater holding portion 610 includes a passive thermal profiling device 634 within slot 603, discussed in more detail below. Heating device 612 can be powered through coupler 620 via any type of power source (not shown). In this embodiment, heater device 612 includes a temperature sensor 640 (e.g., thermocouple) and/or nozzle body 602 can include a temperature sensor 642. In an alternative embodiment, nozzle 600 can be made within the scope of this invention with one or no temperature sensors and/or without a passive thermal profiling device.

In various embodiments, a passive heat-profiling (heat gradient) device 634 can be used to profile heat proximate melt channel 604. For example, this can be done using air gaps or certain materials having higher thermal conductivity or higher thermal insulation characteristics than nozzle body 602. There can be heat loss from nozzle body 602 to a manifold 606 and the tip portion (not shown) of nozzle 600 due to contact by each of these components with surrounding mold plates. Using thermal conductive device 634 can either increase, decrease, or balance the heat flow to melt channel 604 to counteract a non-uniform heat profile that can exist.

In various embodiments, an entire nozzle 600 or nozzle body 602 can be made of copper, copper alloys, and/or any equivalent high thermal conductivity material(s). The nozzle body 602 can be covered by a sleeve, a plate, or a layer 650 made of a thermally insulative material (e.g., ceramics or equivalents), as shown in FIGS. 6A and 6B.

Figure 7B:
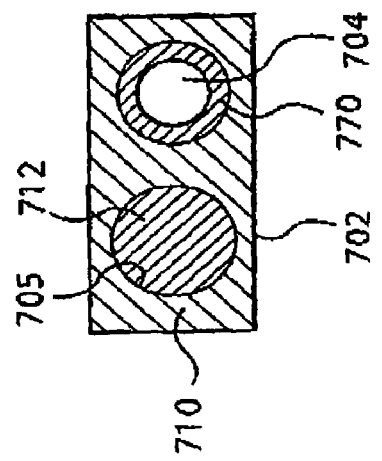
FIGS. 7B and 7C show cross-sectional views of a nozzle along line D—D shown according to various embodiments of the present invention.
Figure 7C:
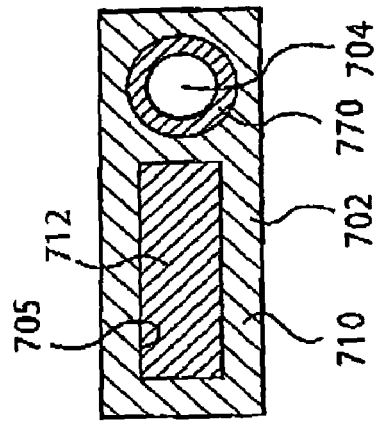
Figure 7A:
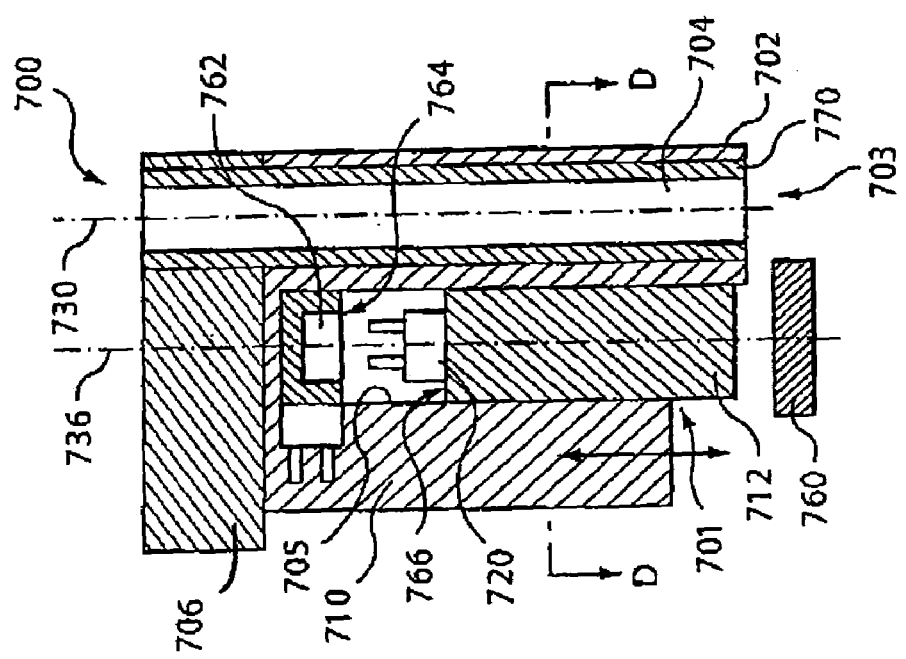
FIG. 7A shows a side-sectional view of a nozzle including a removable heating device according to an embodiment of the present invention.

FIG. 7A shows a side-sectional view of a system 700 (e.g., a nozzle) according to an embodiment of the present invention. Nozzle 700 includes a nozzle body 702 having a melt channel 704. Melt channel 704 runs from manifold 706 through a nozzle tip (not shown). Melt channel 704 includes an axis of symmetry 730. Nozzle body 702 also includes a heater holding portion 710 with a slot 705 that receives a releasably secured heating device 712 (e.g., a removable heater) through a mold end opening 701 adjacent an outlet 703 of melt channel 704. Removable heating device 712 includes an axis of symmetry 736. Heating device 712 can be powered by coupling coupler 720 to coupler 762. This might be done after heating device 712 is enclosed in a slot 705 of heater holding portion 710 using a closing device 760. Coupler 762 can couple heater 712 to any type of power source (not shown).

Heater holding portion 710 includes at least one flat surface 764 that is configured to be substantially in contact with a flat surface 766 of heating device 712 when coupler 720 is fully engaged with coupler 762. Once the couplers 720 and 762 are fully engaged, causing surfaces 764 and 766 to be in contact, power can be supplied to heating device 712 allowing it to operate.

In one embodiment, as best seen in FIGS. 7B and 7C, melt channel 704 can be made of any suitable high wear resistant materials 770 (e.g., carbide, tungsten carbide etc).

FIGS. 7B and 7C show cross-sectional views of nozzle 700 along line D—D in FIG. 7A according to embodiments of the present invention. A main difference between FIGS. 7B and 7C is a shape of slot 705 of heater holding portion 710. In FIG. 7C, slot 705 of heater holding portion 710 is rectangular or square shaped, while in FIG. 7B slot 705 of heater holding portion 710 is round or circular shaped. It is to be appreciated other shapes can also be used, as was discussed above.

In the embodiments shown in FIGS. 6A and 6B, heater 612 is removed from heater holding portion 610 along (in a direction of) axis 632, while in the embodiments shown in FIGS. 7A and 7B, heater 712 is removed from heater holding portion 710 along (in a direction of) axis 736. Also, in FIGS. 6A and 6B, heating device 612 is received into heater holding portion 610 with slot 603 formed as a longitudinal opening or longitudinal slot in a side of nozzle body 602 (i.e., heating device 612 is partially embedded in heater holding portion 610), while in FIGS. 7A–7C, heating device 712 is received into slot 705 of heater holding portion 710 formed as a cavity in a mold end of nozzle body 702. In FIG. 7A, heating device 712 can be considered to be fully embedded in nozzle body 702 because of the use of cover 760, while in FIGS. 7B and 7C heating device 712 can be considered partially embedded in nozzle body 702.

Clamping Functionality

The heater holding portions and heater devices discussed above can be manufactured to allow for a clamping force on the heater device to be exerted by the heater holding portion. This is in contrast to conventional systems, discussed above, which require a clamp to hold a heater device to a nozzle. Through a clamping force, the heater device can be held in intimate contact within the heater holding portion (i.e., near a nozzle body near and its a melt channel) during operation, or at any other time desired. This can result in little if any clearance between the heater device and the nozzle body. This can be done while continuing to allow for the heater device to be releasably secured to the heater holding portion. This clamping force can be based on a shape or make-up of the heater holding portion and/or the combination of the heater holding portion and the heater device.

As one example, in the embodiment shown in FIG. 2, either a "spring-like" action of heater holding portion 110 or an interference or friction fit between heater slot 103 of holding portion 110 and heater device 112 can be used to cause enough clamping force to releasably secure heater device 112 in heater holding portion 110. The interference or friction fit can be caused through surface texture or coatings on one or both slot 103 and heater device 112. An amount of the clamping force can increase from a time when system 100 is cold (e.g., room temperature, or the like) to a time when system 100 is hot (e.g., during operation of a system). This can be accomplished through a thermal expansion of a casing of heater device 112 and/or heater holding portion 110, which decreases a clearance between heater device 112 and nozzle body 102.

As another example, in the embodiment shown in FIG. 3, the same functionality can be used to establish a clamping force as the embodiment in FIG. 1. Additionally, based on the wedge shape of heater device 112 and a complementary shape of slot 103 for receiving heater device 112 in heater holding portion 110, a higher amount of clamping force can be established. This is because an interaction of the tapered shapes can cause additional clamping forces.

The other embodiments discussed above can have similar or different clamping mechanisms. For example, using a bimetallic material for either one or both of the heater device and the heater holding portion can allow for clamping force to be established between the two.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. An injection molding system, comprising:
   an injection manifold;
   an injection nozzle in fluid communication with the manifold, the nozzle including a nozzle body that includes:
   a melt channel, and
   an elongated heater holding portion running longitudinally in a side of the nozzle body, and configured to laterally receive and releasably secure a heating device therein.

2. The system of claim 1, wherein the nozzle body is made from one of an iron-cobalt-nickel alloy that has been strengthened by carbon, chrome and molybdenum, copper and copper alloy.

3. The system of claim 1, wherein the heating device has a rectangular-shaped cross-section.

4. The system of claim 1, wherein the heating device has a wedge-shaped cross-section.

5. The system of claim 1, wherein the heating device is secured within a slot included in the heater holding portion and the slot and the heating device have complimentary geometries.

6. The system of claim 1, wherein the heating device further comprises:
   a holding device having one or more receiving areas; and
   one or more releasably securable heaters, wherein each of the receiving areas receives a respective one of the heaters.

7. The system of claim 1, wherein the heater holding portion comprises an elongated slot in the side of the nozzle body.

8. The system of claim 1, wherein the heating device is releasable from the nozzle body without removing the nozzle body from the system.

9. The system of claim 1, wherein the nozzle body comprises a flat nozzle body.

10. The system of claim 1, wherein the nozzle body comprises a small pitch nozzle body.

11. The system of claim 1, further comprising an array of nozzles, each nozzle having a heating device secured therein.

12. A method for heating a melt in an injection molding system, comprising:
    receiving the melt in a melt channel of a nozzle body; and
    operating a heater that is secured in a longitudinal slot of an elongated heater holding portion formed in a side of the nozzle body wherein the heater holding portion is configured to laterally receive and releasably secure the heater therein.

13. A method of assembling an injection molding apparatus, comprising:
    providing a manifold;
    coupling a nozzle in fluid communication with the manifold, said manifold having a nozzle body including a melt channel and an elongated heater holding portion with a longitudinal slot; and
    releasably securing a heating device laterally into the slot of the heater holding portion.

14. The method of claim 13, further comprising providing a heating device that has a complementary shape with respect to the slot of the heater holding portion.

15. The method of claim 13, further comprising assembling the heating device by inserting one or more heaters into one or more heater receiving areas of a heater holding device.

16. An injection molding nozzle, comprising:
an injection nozzle body including a melt channel and a heater holding portion, the heater holding portion having a slot with an opening adjacent to an outlet of the melt channel on one end and a flat surface on an opposite end; and
a heating device releasably secured in the slot of the heater holding portion, the heating device having a flat surface that abuts the flat surface of the slot when the heating device is fully secured in the slot.

17. An injection molding system comprising:
a heater device;
an injection nozzle having a nozzle body, said nozzle body having a heater holding portion configured to laterally receive the heater device and provide a clamping force upon the heater device, such that the nozzle body and the heater device are in substantially intimate contact, but remain releasably secured.

18. The injection molding system of claim 17, wherein the clamping force is generated by a spring action of the heater holding portion.

19. The injection molding system of claim 17, wherein the clamping force is generated through an interference fit between a slot formed in the heater holding portion and the heater device.

20. The injection molding system of claim 17, wherein the clamping force is generated through thermal expansion of one of the heater device and the heater holding portion.

21. The injection molding system of claim 17, wherein the clamping force is generated through a friction fit between the heater device and a slot of the heater holding portion.

22. The injection molding system of claim 20, wherein the clamping force is generated through a difference in thermal expansion rate between the heater holding portion and the heater device.

23. The injection molding system of claim 1, wherein the heating device has a polygonal cross-section.

24. The injection molding system of claim 17, wherein the heater device has a polygonal cross-section.

* * * * *